United States Patent [19]

Shitanoki et al.

[11] Patent Number: 5,066,039
[45] Date of Patent: Nov. 19, 1991

[54] AIR BAG DEVICE FOR PROTECTING A VEHICLE OCCUPANT

[75] Inventors: Kazuaki Shitanoki; Masaaki Kawaguchi; Saburo Kobayashi, all of Wako, Japan

[73] Assignee: Honda Giken Kogyo Kabushiki Kaisha, Tokyo, Japan

[21] Appl. No.: 339,047

[22] Filed: Apr. 17, 1989

[30] Foreign Application Priority Data

Apr. 20, 1988 [JP] Japan ................................. 63-95706

[51] Int. Cl.⁵ .............................................. B60R 21/26
[52] U.S. Cl. .................................... 280/741; 280/743; 149/3; 244/31
[58] Field of Search ................ 280/743, 728, 731, 730, 280/732, 736, 737, 741; 441/40, 98; 383/3; 422/166; 149/3; 410/119; 244/31

[56] References Cited

U.S. PATENT DOCUMENTS

| | | | |
|---|---|---|---|
| 2,309,256 | 1/1943 | Rekersdres | 441/98 |
| 2,413,985 | 1/1947 | Manson et al. | 441/40 |
| 3,109,607 | 11/1963 | Lally | 244/31 |
| 3,276,726 | 1/1966 | Webb | 244/31 |
| 3,425,712 | 2/1969 | Berryman | 280/739 |
| 3,430,979 | 3/1969 | Terry et al. | 280/733 |
| 3,724,870 | 4/1973 | Kurokawa | 280/741 |
| 3,776,570 | 12/1973 | Weman | 280/738 |
| 3,883,154 | 5/1975 | McCullough, Jr. et al. | 280/743 |

FOREIGN PATENT DOCUMENTS

| | | |
|---|---|---|
| 2029587 | 12/1971 | Fed. Rep. of Germany . |
| 1780250 | 4/1972 | Fed. Rep. of Germany . |
| 958177 | 9/1982 | U.S.S.R. ............................. 280/736 |

Primary Examiner—Charles A. Marmor
Assistant Examiner—Karin Tyson
Attorney, Agent, or Firm—Armstrong, Nikaido Marmelstein, Kubovcik & Murray

[57] ABSTRACT

An air bag device for use with a motor vehicle has an inflatable bag on the inner surface of which is provided a thin film-like layer of gas generating agent. At least one igniter is mounted in a part of the thin gas generating agent layer. When the vehicle encounters a collision, the gas generating agent is ignited by the igniter to generate gas. The gas fills up and thereby inflates the bag to restrain an occupant of the vehicle.

7 Claims, 4 Drawing Sheets

AIR BAG DEVICE FOR PROTECTING A VEHICLE OCCUPANT

BACKGROUND OF THE INVENTION

The present invention relates to an air bag device having an inflatable bag for restraining an occupant of a motor vehicle in the event of a collision of the vehicle and, more particularly, to an air bag device of the type having a bag which is inflatable by gas generated by the combustion of a gas generating agent.

An air bag device is one of various implementations extensively used to restrain an occupant of a motor vehicle in his or her seated position when the vehicle encounters a collision. The air bag device includes an inflatable bag which is mounted in a folded position on a steering wheel or similar member which is located in front of an occupant. When the device senses a collision, it feeds a jet of gas into the bag so that the bag is rapidly inflated toward the occupant who is thrown forward to thereby restrain the occupant.

Systems for inflating the bag available in the art may generally be classified into two types, i.e., a non-combustion type system which releases compressed gas instantaneously to introduce it in the bag, and a combustion-type system which burns an explosive or similar gas generating agent to introduce the resulting gas in the bag. In general, the combustion type system is predominant over the non-combustion type system because it is more compact in construction and therefore more advantageously mounted on a motor vehicle than the latter.

An air bag device using the combustion scheme mentioned above may be implemented by a gas generator in the form of a container which stores a gas generating agent therein, as disclosed in U.S. Pat. No. 4,183,550 by way of example. The container is mounted in an inflatable bag to protrude into the latter. When the gas generating agent in the container is burned, the resulting gas is caused to jet into the bag. A drawback with the gas generator in the form of a container is that it has to be made of metal or similar material which is rigid enough to withstand the high pressure of combustion gas, increasing the weight of the gas generator. When an air bag device having such a heavy gas generator is mounted on a steering wheel, it is apt to cause the steering wheel to vibrate during idling or similar operating condition and, therefore, it is necessary to provide a steering column and its associated members with an extra measure against vibrations.

Further, the gas generator protruding into the bag as mentioned above prevents the bag from being folded flat. Hence, the prior art air bag device of the kind described has substantial overall dimensions even when the bag is folded up. The protruding gas generator of course makes it impossible to provide the whole device with a shape which is free to choose. It follows that a location available for mounting the air bag device without impairing the appearance is extremely limited. In addition, since the container type gas generator is provided with only a fixed gas jetting position, it is not practicable to control the sequence of development of the bag.

SUMMARY OF THE INVENTION

It is therefore an object of the present invention to provide an air bag device which can have an extremely compact construction and any desired shape when an inflatable bag thereof is folded up, and can therefore be situated in various portions within a vehicle compartment.

It is another object of the present invention to provide a light-weight air bag device capable of inflating a bag by combustion gas which is generated without resorting to a container-like gas generator.

It is another object of the present invention to provide an air bag device which allows its bag to be readily controlled with respect to the position for starting development, the interval between the start and the end of expansion, etc.

In order to achieve the above objects, in accordance with the present invention, a gas generating agent is deposited in the form of a thin film on the inner surface of a bag so as to be ignited directly. The gas generating agent may be implemented as a gelatinous explosive which is thinking applied to the inner surface of the bag, forming a gas generating agent layer thereon. Alternatively, a non-woven cloth impregnated with a liquid explosive may be adhered to the inner surface of the bag. An igniter may be constituted by an electric heater which generates heat when supplied with a current.

In the above construction, when the gas generating agent layer on the bag inner surface is ignited, the agent burns along the bag inner surface so that the resulting gas fills the interior of the bag to inflate it. This eliminates the need for a container-like gas generator and thereby reduces the overall weight of the air bag device. The bag having no protuberance or similar obstruction can be folded up in an extremely compact configuration.

In a preferred embodiment of the present invention, the bag includes a base cloth and a coating which is provided on the inner surface of the base cloth and implemented by silicon rubber or similar heat-resistive material, the gas generating agent layer being formed on the inner surface of the coating. The bag is therefore maintained air-tight even when the gas generating agent layer is burned. A heat-insulative layer may be interposed between the base cloth and the coating to prevent the base cloth from being weakened by the heat ascribable to the combustion.

Preferably, a protector cover constituted by a nylon film, for example, is provided on the inner surface of the gas generating agent layer. Even when the gas generating agent layer is constituted by a gelatinous explosive, the protector cover will prevent facing parts of the gas generating agent layer from adhering to each other when the bag is folded, while preventing the gas generating agent from coming off the bag.

A plurality of igniters may be used and arranged on the inner surface of the bag remote from each other. Such igniters are ignited at different points on the bag. This allows the positions and times for the generation of gas to be freely selected and therefore allows the bag to be controlled with respect to the position for starting inflation, the interval between the start and the end of inflation, etc.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
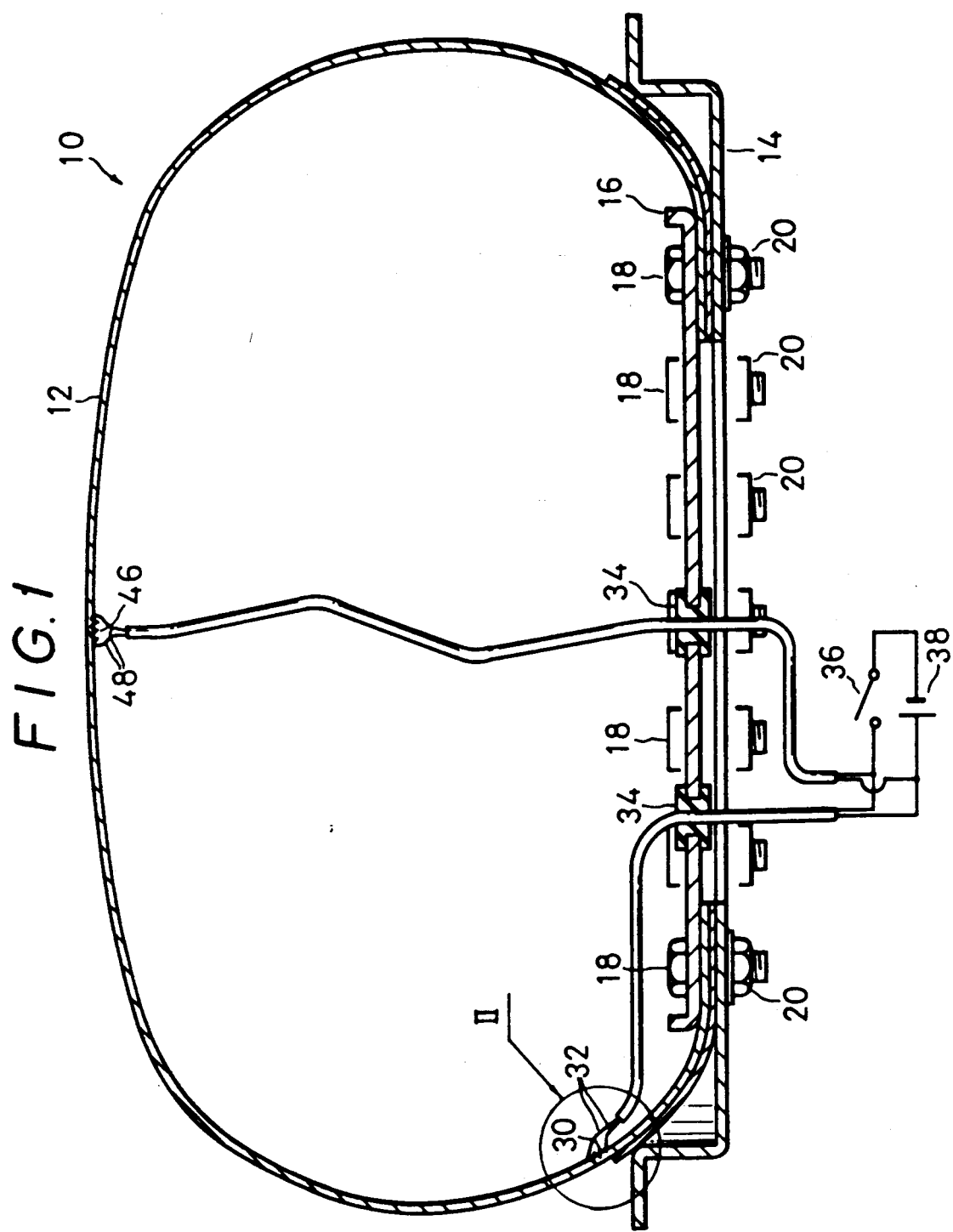
FIG. 1 is a section showing an air bag device embodying the present invention, a bag of the device being shown in an inflated condition.

Referring to FIG. 1 of the drawings, an air bag device embodying the present invention is shown and generally designated by the reference numeral 10. As shown, the air bag device 10 is generally made up of an inflatable bag 12 and a retainer 14 which supports a base portion of the bag 12. The base portion of the bag 12 is held between the retainer 14 and a fixing plate 16 and fastened to the retainer 14 and fixing plate 16 by bolts 18 and nuts 20, whereby the interior of the bag 12 is airtightly isolated from the outside. The air bag device 10 is securely mounted on a steering wheel (not shown) by the retainer 14.

Figure 2:
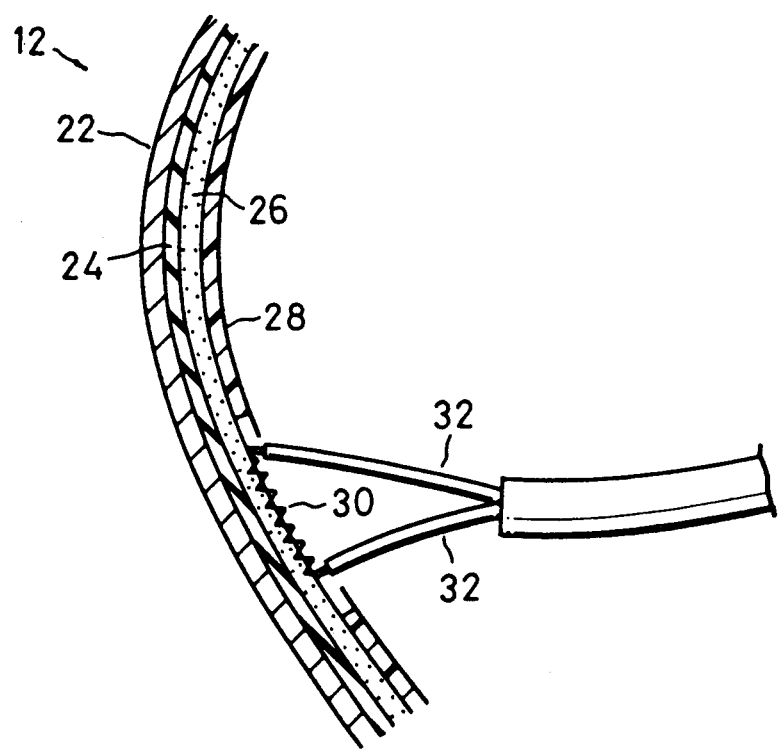
FIG. 2 is an enlarged view of a portion of the air bag device indicated by an arrow II in FIG. 1.

As shown in FIG. 2, the inflatable bag 12 has a stout and fexible base cloth 22 and a film-like coating 24 which is provided on the inner surface of the base cloth 22 for providing the latter with air-tightness. The base cloth 22 may be implemented by a fabric of nylon filaments by way of example, while the coating 24 may be implemented by silicon rubber or similar heat-resistive material. A layer of gas generating agent 26 is provided on the inner surface of the coating 24 in the form of a thin film. To form this layer 26, a gas generating agent such as a perchlorate explosive or similar gelatinous explosive is thinkly applied to the inner surface of the coating 24 or, alternatively, a non-woven cloth impregnated with a gas generating agent in the form of a liquid explosive is adhered to the same.

A protector cover 28 is implemented by a nylon film, for example, and is provided on the inner surface of the gas generating agent layer 26. When the bag 12 is folded up, the protector cover 28 will intervene between and physically isolate the facing parts of the gas generating agent layer 26 to thereby prevent the latter from adhering to each other. Another function of the protector cover 28 is to prevent the gas generating agent layer 26 from coming off the inner surface of the bag 12. A part of the protector cover 28 adjacent to the base portion of the bag 12 is removed to uncover the gas generating agent layer 26. An electric heater 30 is provided in the removed part of the protector cover 28 to serve as an igniter. A pair of ignition leads 32 are connected to the heater 30 at one end thereof. As shown in FIG. 1, the other end of the leads 32 are extended to the outside of the bag 12 through a grommet 34 which is fitted in a small opening of the fixing plate 16. A power source 38 is connected to the outermost end of the leads 32 via a switch 36 which is responsive to a collision of the motor vehicle on which the device 10 is mounted.

Figure 3:
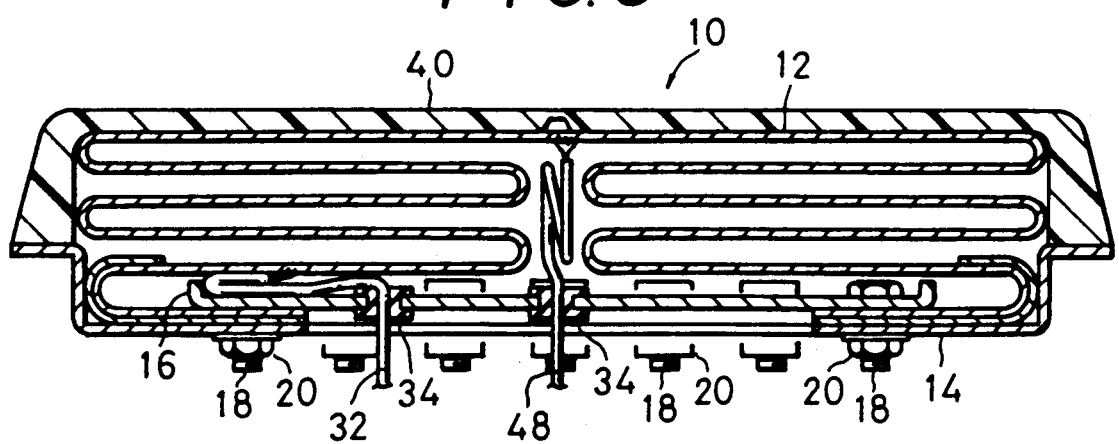
FIG. 3 is a section showing the air bag device of FIG. 1 in a folded condition for storage.
Figure 6:
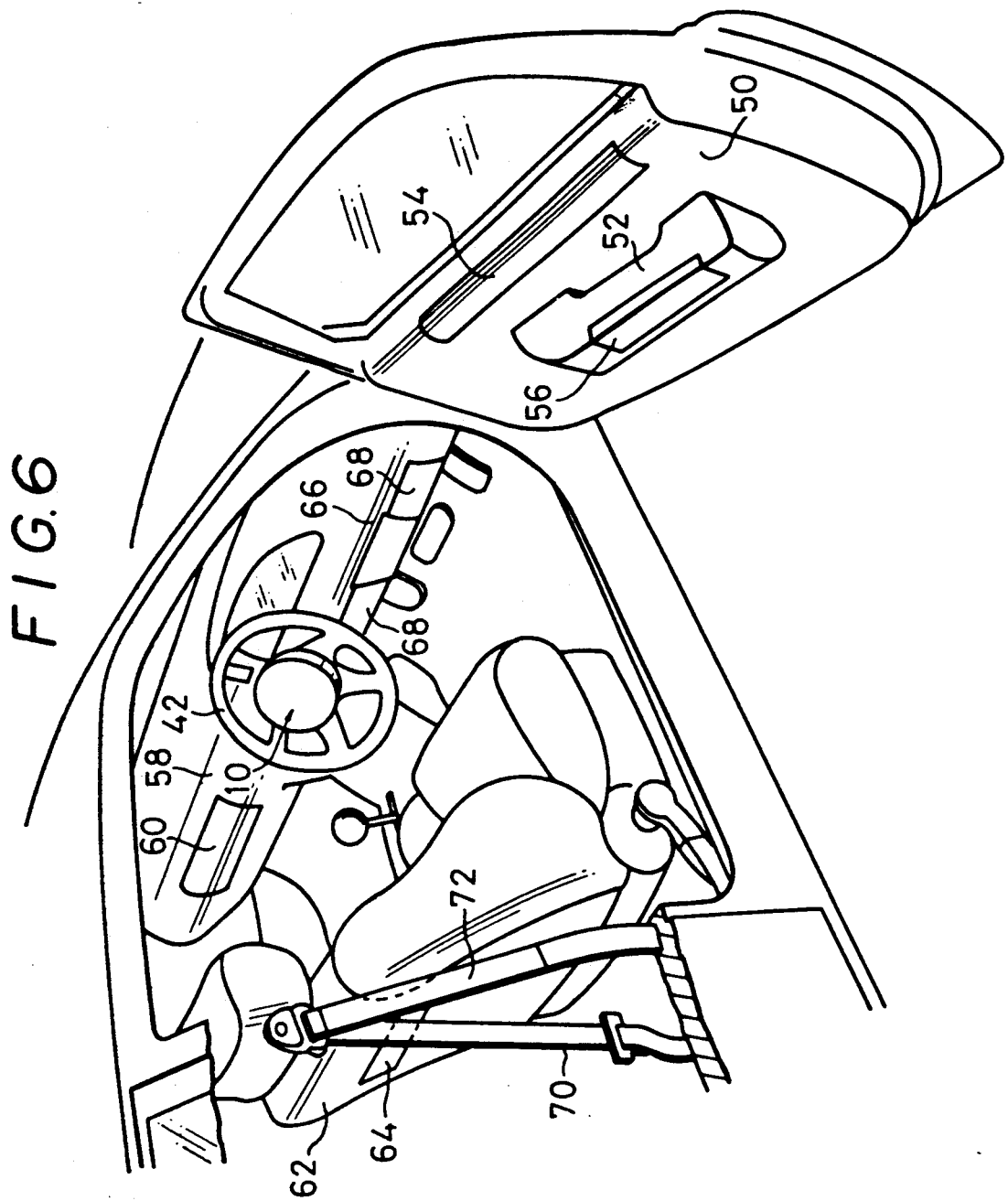
FIG. 6 is a perspective view of a passenger compartment of a motor vehicle, showing various positions where an air bag device of the present invention may be applied.

The air bag device 10 having the above construction is stored with its bag 12 folded up, as shown in FIG. 3. As shown in FIG. 6, the device 10 is mounted on substantially the center of a steering wheel 42 with a cover 40 (FIG. 3) covering the folded bag 12. Since a container-like gas generator or similar protrusion is absent in the interior of the bag 12, the bag 12 can be folded entirely flat and therefore renders the whole device 10 extremely compact.

Upon collision of the motor vehicle, the switch 36 senses it and is closed thereby. Then, the heater 30 ignites the gas generating agent layer 26 resulting in the gas generating agent of the layer 26 being burned. This combustion rapidly extends along the inner periphery of the bag 12 while causing the resulting gas to fill up the bag 12, i.e., the bag 12 is rapidly expanded toward a vehicle occupant. As a result, the vehicle occupant thrown forward due to the collision is received by the inflated bag 12.

Figure 4:
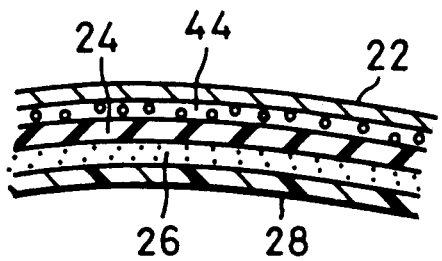
FIG. 4 is an enlarged fragmentary section showing an alternative embodiment of the present invention.

While the bag 12 is inflated as stated above, the protector cover 28 provided on the inner surface of the gas generating agent layer 26 is melted by the combustion heat of the gas generating agent and/or torn down by the pressure of the combustion gas. The base cloth 22 is prevented from being weakened by the heat because the gas generating agent layer 26 is thin enough to complete combustion at any one point instantaneously. The heat-resistive coating 24 insures the air-tightness of the base cloth 22. When it is desired to further enhance the protection of the base cloth 22 against heat, a heat-insulative layer 44 made of foaming resin or similar material may be interposed between the base cloth 22 and the coating 24, as shown in FIG. 4.

Assuming that the inside volume of the bag 12 is 60 liters for example, the amount of gas generating agent needed to fully inflate the bag 12 is not more than 50 grams to 100 grams. Such a small amount of gas generating agent forms a layer as thin as 0.5 millimeter to 0.8 millimeter when applied to the entire inner surface of the bag 12. The bag 12 is therefore prevented from losing flexibility despite the presence of the gas generating agent layer 26. Further, the protector cover 28 should only be implemented by a film which is as thin as 0.05 millimeter to 0.3 millimeter, hardly effecting the flexibility of the bag 12.

As shown in FIG. 1, another heater 46 may be provided on the inner surface of the bag 12 remote from the previously mentioned heater 30. This causes the gas generating agent layer 26 to be ignited at a plurality of spaced points and thereby promotes fast propagation of the combustion of the layer 26. The heaters 30 and 46 may be designed to ignite the gas generating agent layer 26 at slightly different timings from each other. Furthermore, the heaters 30 and 46 may be respectively located in the vicinity of the base portion of the bag 12 and in the central portion of the same so as to cause the bag 12 to start expanding at such different positions at the same time. In this manner, it is possible to control the interval between the start and the end of inflation of the bag 12, the sequence of development due to expansion, etc.

Once the gas generating agent layer 26 is ignited, it is not necessary for the heaters 30 and 46 to be held in connection with the layer 26. It follows that the leads 32 and 48 for supplying a current to the heaters 30 and 46 need only be short, i.e., they only have to remain in connection with the layer 26 when the bag 12 is in a folded position. Since the heaters 30 and 46 and the leads 32 and 48 can be provided with a sufficient degree of flexibility, they will not obstruct the folding operation of the bag 12 at all.

Figure 5A:
FIGS. 5a, 5b and 5c are schematic perspective views showing specific configurations in which an air bag of the device of the present invention may be folded.
Figure 5B:
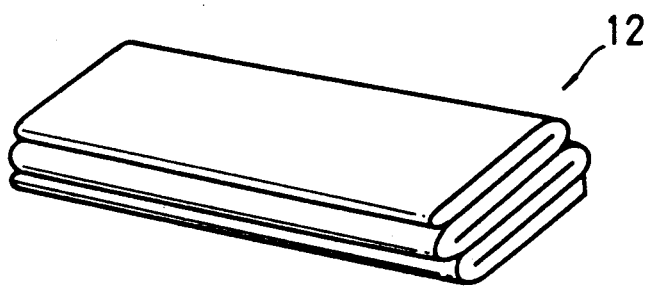
Figure 5C:
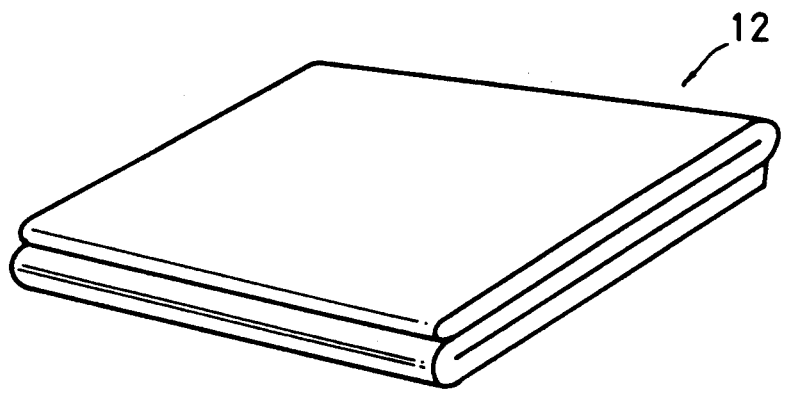

As stated above, a major part of an air bag device of the present invention is constituted only by the flexible inflatable bag 12 on the inner surface of which a gas generating agent is deposited as the thin layer 26. The inflatable bag 12 may be rolled up as shown in FIG. 5a, or folded up in an elongate configuration as shown in FIG. 5b or in a flat configuration as shown in FIG. 5c. The retainer 14 and fixing plate 16 associated with the bag 12 may be configured as desired in matching relation to the configuration of a position where the air bag device is to be mounted. This allows the air bag device to be stored in any desired folded configuration. For example, as shown in FIG. 6, the device may be built in a door lining 50 or a door arm rest 52 to constitute an air bag device 54 or 56 for restraining a vehicle occupant who is thrown sideways in the event of a collision. The device may even be built in the front pillar or the roof lining to restrain the vehicle occupant from the upper right or the upper left. As shown in FIG. 6, when the device is mounted on an instrument panel 58 of the motor vehicle as an air bag 60, it will protect an occupant who sits in the front seat next to the driver. The device may be mounted on the seat back of a front seat 62 to serve as an air bag device 64 for the protection of a rear seat occupant. Further, the device may be built in a knee bolster 66 to constitute an air bag device 68 for protecting the occupant's knees from injury.

Concerning a seat belt 70 shown in FIG. 6, a part thereof which makes contact with an occupant may be constituted by an air bag device 72 in the form of an elongate, folded inflatable bag. In the event of a collision, the bag will be expanded to increase its width so as to reduce the pressure per unit area which would be applied to the occupant wearing the seat belt 70.

Various modifications will become possible for those skilled in the art after receiving the teachings of the present disclosure without departing from the scope thereof.

What is claimed is:

1. An air bag device for protecting a vehicle occupant, comprising:
    a gas generating agent for generating gas when burned;
    an igniter for igniting said gas generating agent;
    an inflatable bag to be inflated by the gas generated by said gas generating agent, said inflatable bag including a base cloth and a heat-resistive coating provided on an inner surface of said base cloth; and
    a substantially imperforate protector cover provided inside of said inflatable bag;
    said gas generating agent being provided in the form of a thin layer of a gelatinous material on an inner surface of said heat resistive coating;
    said protector cover being disposed on an inner surface of said thin layer of said gas generating agent for isolating parts of said thin layer which face each other when said bag is folded up and for preventing said thin layer from coming off;
    said igniter being provided in a part of said thin layer of said gas generating agent wherein said protective cover is melted and/or torn down when gas is generated by said gas generating agent.

2. An air bag device as claimed in claim 1, wherein said bag further comprises a layer of a heat-insulative material interposed between said base cloth and said heat resistive coating.

3. An air bag device as claimed in claim 1, wherein said gas generating agent comprises a gelatinous explosive, said layer of said gas generating agent being formed by applying said gelatinous explosive to the inner surface of said bag.

4. An air bag device as claimed in claim 1, wherein said layer of said gas generating agent comprises a gas generating agent-containing thin film which is adhered to the inner surface of said bag.

5. An air bag as claimed in claim 1, wherein said igniter comprises an electric heater which generates heat when a current flows therethrough.

6. An air bag as claimed in claim 1, wherein plural said igniters are provided at spaced locations on the inner surface of said bag.

7. An air bag device for protecting a vehicle occupant, comprising:
    a gas generating agent for generating gas when burned;
    an igniter for igniting said gas generating agent;
    an inflatable bag to be inflated by the gas generated by said gas generating agent; and
    a substantially imperforate protector cover provided inside of said inflatable bag;
    said gas generating agent being provided in the form of a thin layer of a gelatinous material on an inner surface of said heat resistive coating;
    said protector cover being disposed on an inner surface of said thin layer of said gas generating agent for isolating parts of said thin layer which face each other when said bag is folded up and for preventing said thin layer from coming off;
    said igniter being provided in a part of said thin layer of said gas generating agent wherein said protective cover is melted and/or torn down when gas is generated by said gas generating agent.

* * * * *